Patented June 18, 1935

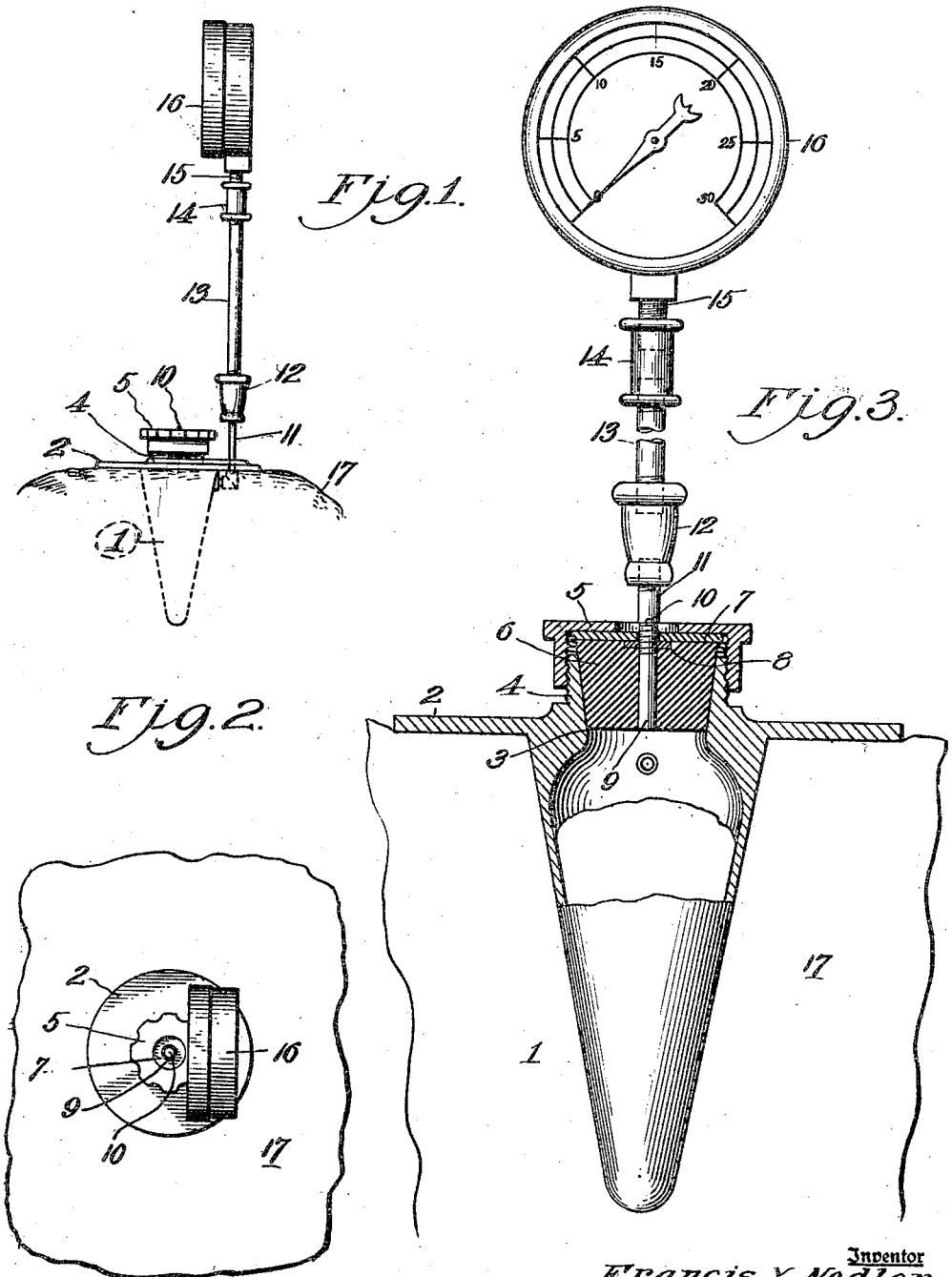

2,005,592

UNITED STATES PATENT OFFICE 2,005,592

METHOD AND APPLIANCE FOR DETERMINING DEGREE OF DOUGH FERMENTATION

Francis X. Nodler, Arkansas City, Kans., assignor of one-half to Martha Nodler, Arkansas City, Kans.

Application January 19, 1934, Serial No. 707,296

4 Claims. (Cl. 73—51)

This invention relates to a method and appliance for determining degree of dough fermentation, and more especially to a method of and appliance for indicating the pressure developed by fermentation of dough for use in the making of bread, pastry, cake and the like.

It is well known to bakers that to produce loaves of bread or the like, which are of substantially uniform size, appearance, quality and texture, of every batch or mix of the same formula, it is essential that the temperature of the room in which the dough is set shall be maintained at approximately the same degree for each batch, if the seting time is the same. To maintain the dough mixing and setting room at a predetermined temperature is an expensive proceeding, and small bakers have found the expense prohibitive and have had to resort to visual and tactual inspection of the dough to ascertain the time when it should be baked. It is impossible for the bakers, using this conventional testing method, to produce exactly the same results for each batch.

Disregarding the formula used in the bakery, it is well understood that the size, appearance, texture and quality of a loaf or the like, is dependent to a large extent upon the degree of fermentation the dough is permitted to undergo before baking, and one of my objects, therefore, is to produce an appliance whereby the baker can determine the degree of fermentation by the gaseous pressure developed by a predetermined quantity of the dough of a batch. The entire batch might be used, but the expense and inconvenience of weighing and handling such a large volume may be avoided by making the pressure test with a predetermined fractional part of the batch, as will hereinafter more particularly appear.

My invention further lies in ascertaining and setting up a predetermined pressure as a standard for each formula or mix, which the baker employs in making his various products. By way of example, the baker will produce a batch of formula A dough. Disregarding the temperature of the setting room, the baker will place a predetermined weight or volume of the formula A dough in a closed vessel equipped with a gage or signal operated by pressure developed within the vessel. He permits each sample tested, to develop a different pressure, say 20 lb., 30 lb. and 40 lb., and immediately each sample reaches the desired pressure, he molds and bakes a loaf of bread from the mass of dough, it being understood that the samples and mass of dough are at the same or substantially the same temperature. It will be found that there is one particular gas pressure which produces a loaf of size, appearance, quality and texture most pleasing to the baker. He then proceeds to record this pressure as a standard for dough of formula A. He will then set up a standard for formula B, etc. Thereafter, whenever the baker is making up a batch of dough of one of his standardized formulas, all he needs to do is to provide means to register the pressure developed by a quantity of standard weight or volume, and when the pressure reaches the standard pressure for that particular formula, proceeds immediately to mold and bake the bread, and the result, each time, will be identical with his standard as set up by experimentation.

In the apparatus for carrying out the invention, it has been found more convenient to use a relatively small vessel for pressure registration, and to instruct the baker to deposit therein a sample of the standardized weight, or he can substantially fill the vessel and thereby insure a proper test without depending upon the necessity of weighing or otherwise measuring the quantity to be tested.

With the general objects named in view, and others as will hereinafter appear, the invention consists in the method outlined, and certain novel and useful features of construction and organization of parts as hereinafter described and claimed; and in order that it may be fully understood, reference is to be had to the accompanying drawing, in which:—

Figure 1 is an elevational view of a fermentation pressure-determining appliance embodying the invention and shown in operative relation to a batch of dough.

Figure 2 is a top plan view.

Figure 3 is an enlarged central vertical section shown as containing a fragment of dough.

In the said drawing, 1 indicates a metal container, the same, in its preferred form, being of wedge or inverted-conical shape. At its upper end it is formed with an outwardly projecting flange 2 which provides a stop limiting insertion of the device into the mass of dough and insuring that, as the dough rises, the device will be lifted instead of being entirely surrounded or embedded in the dough. The device also has a relatively large circular opening 3, and an externally threaded neck 4, the inner surface of the neck constituting an extension of the opening which is of downwardly-tapering form.

A hand-operable screw cap 5 engages the threaded neck, and a compressible plug 6 closing the opening 3, may be clamped firmly in place by proper adjustment of the cap. To enable the cap to be readily turned without acting frictionally on the plug, a metal washer 7 fits within the cap and upon the plug, the pressure of the washer on the plug occurring also on a nut 8 screwed upon the conventional tubular housing of a suitable valve unit 9, vulcanized or cemented in the plug and establishing communication between the chamber of the container and the atmosphere when the valve stem 10 is depressed to relieve the pressure within the chamber. The pressure in the chamber is released by the valve 10 before the cap 5 is opened so as to avoid the danger of the blowing off of the cap upon being unscrewed.

To indicate the amount of pressure developed within the container, as hereinafter explained, one signal device may comprise a conventional pressure gage attachment, as follows: 11 is a tube extending through the top of the container exterior to the cap and communicating with the chamber of the vessel, 12 is a coupling between the upper end of the tube 11 and a larger tube 13, connected by a coupling 14 to the stem 15 of a conventional pressure gage 16.

To determine the extent of fermentation occurring in a batch of dough 17, the container is placed in contact with the latter (although this is not essential except to insure that the dough within and without the container have the same temperature, i. e., if both are known to be at room temperature, contact is not essential). The contact is preferably made by thrusting the container into the mass of dough until arrested by engagement of the flange 2 with the surface of the batch.

A piece of dough of determined weight or of sufficient volume to fill the container to a predetermined point, is now placed in the container and is sealed therein by the plug and cap. Within a relatively short time, depending upon temperature, fermentation sets in, and this pressure will be registered on the gage. When the pressure reaches the known standard for the dough mix or formula being set, the operator will know that the batch is ready to be molded and baked in order to produce bread of the same appearance, size, weight, texture and quality as his standard loaf of that formula. Other things, remaining equal, it is the temperature of the dough while being set, which determines the time required to reach the standard pressure. It will be evident that the pressure, besides being utilized to operate a visual pressure gage, may be used to operate lights, bells, gongs, or other signals, either in the setting room or at remote points, whichever is most convenient for the particular bakery.

From the foregoing, it will be apparent that I have evolved a method and appliance giving the advantages set forth as desirable in the statements of the objects of the invention, and which may be obtained in varying embodiments within the spirit and scope of the appended claims.

I claim:—

1. An appliance for determining the gas pressure developed by a batch of dough which comprises an air-tight container having a marginal flange limiting embedment of the container in the dough mass, the container having an opening for ingress of a piece of dough, a cap for sealing the opening, and means for indicating pressure of gases of fermentation arising from the piece of dough.

2. An appliance for determining the gas pressure developed by a batch of dough which comprises an air-tight container having a marginal flange limiting embedment of the container in the dough mass, the container having an opening for ingress of a piece of dough, a cap for sealing the opening, means for indicating pressure of gases developed within the container, and means for releasing such pressure preliminary to the opening of the cap.

3. A process of determining the desired degree of fermentation in a dough batch regardless of change in temperature of the batch and the time of fermentation, which comprises confining a sample of the batch in a heat transmitting container in constant contact with the batch so that th temperature of the sample will always be the same as that of the batch, regardless of whether the temperature of the batch rises or falls, and determining the degree of fermentation of said sample.

4. A process of determining the desired degree of fermentation in a dough batch regardless of a loss of temperature by the batch and the time of fermentation, which comprises confining a sample of the batch; maintaining a heat transmitting relation between the batch and sample so that the latter shall always stand at the temperature of the former regardless of its variations in temperature, and determining the degree of fermentation of the sample by measuring the gases evolved by said sample.

FRANCIS X. NODLER.